United States Patent [19]

Kuo

[11] Patent Number: 4,848,110
[45] Date of Patent: Jul. 18, 1989

[54] ADJUSTABLE CAR LOCK DEVICE

[76] Inventor: Li T. Kuo, No. 16, Lane 459, Section 1, An Ping Road, Tainan, Taiwan

[21] Appl. No.: 231,062

[22] Filed: Aug. 11, 1988

[51] Int. Cl.[4] ............................................. E05B 67/22
[52] U.S. Cl. ..................................... 70/38 C; 70/238; 70/386
[58] Field of Search ................... 70/38 C, 38 E, 238, 70/239, 38 R, 38 A, 38 B, 39

[56] References Cited

U.S. PATENT DOCUMENTS

| | | | |
|---|---|---|---|
| 1,531,002 | 3/1925 | Barravecchia | 70/238 |
| 2,460,615 | 2/1949 | Andrew | 70/386 |
| 4,730,470 | 3/1988 | Zane | 70/238 |

FOREIGN PATENT DOCUMENTS

| | | | |
|---|---|---|---|
| 850440 | 8/1981 | U.S.S.R. | 70/238 |
| 941212 | 11/1963 | United Kingdom | 70/238 |
| 1269513 | 4/1972 | United Kingdom | 70/238 |
| 2103700 | 2/1983 | United Kingdom | 70/38 A |

Primary Examiner—Robert L. Wolfe
Attorney, Agent, or Firm—Lowe, Price, Leblanc, Becker & Shur

[57] ABSTRACT

This invention relates to an adjustable car lock device and, in particular, to one including a lock body with one end that connects to a barrel which has one end connected to the lock body and other end connected with a cylinder. The cylinder accommodates a lock hook which has rotatably adjustable rod whereby the length of the lock device may be adjusted to meet different distance between steering wheel and the brake/gas pedal. The lock hook has a U hook which is foldable to save storage space.

4 Claims, 5 Drawing Sheets

ADJUSTABLE CAR LOCK DEVICE

BACKGROUND OF THE INVENTION

Prior art car lock devices utilize a spindle of the lock body and nodes of the lock hook to make length adjustments. However, such lock devices require much larger space to store and may sometimes hit either passenger the or the instrument panel incidentally.

There is, therefore, a need for an adjustable car lock device, which can be shortened, e.g., by more than 2/5 in length when not in use and the length which may be adjusted to meet different distances between the steering wheel and foot brake or gas pedal of the vehicle locked thereby.

SUMMARY OF THE INVENTION

It is the primary object of the present invention to provide an adjustable car lock device which is shorter in length than other such devices known in the prior art when in storage.

It is another object of the present invention to provide an adjustable car lock device the length of which is adjustable to suit the distance between steering wheel and foot brake or gas pedal of the vehicle locked by it.

It is still another object of the present invention to provide an adjustable car lock device which is easy to use.

It is a further object of the present invention to provide an adjustable car lock device which is inexpensive to produce.

DETAILED DESCRIPTION OF THE PREFERRED EMBODIMENT

Figure 1:
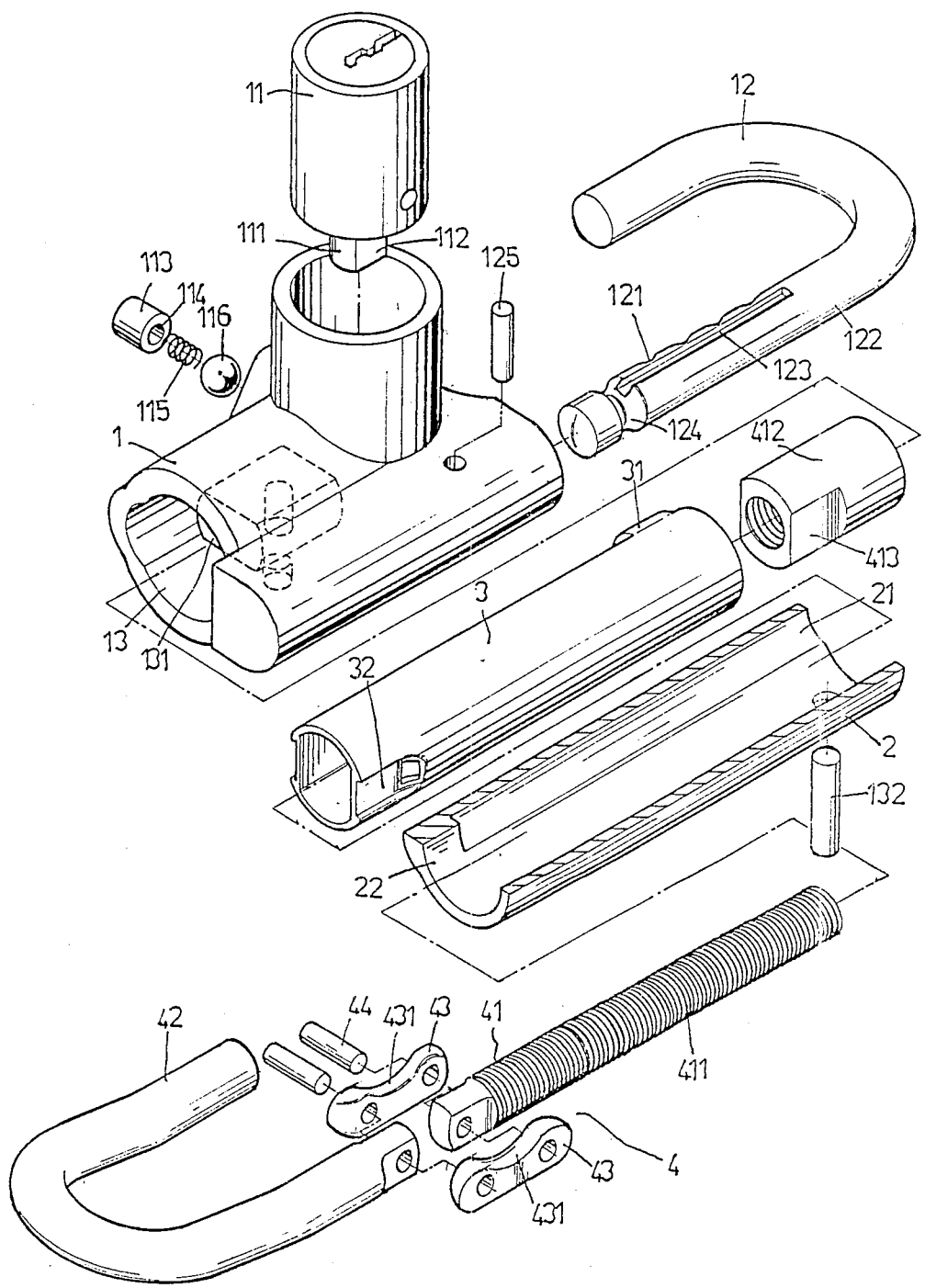
FIG. 1 is an exploded view of the present invention.

Reference is now made to FIG. 1 which comprises a lock body 1, a barrel 2, a cylinder 3 and a lock hook 4. Said lock body 1 has a spindle 11, a lock rod 12, a cylinder hole 13. The spindle 11 has a guide block 111 at one end, a buffer 113, a hole 114, a spring 115, a steel ball 116, a pin 125 and a block 131. Said guide block 111 has a flat surface at one side. Said buffer 113 has a hole 114 for the insertion of the spring 115 and the steel ball 116. And the buffer 113 is in touch with the guide block 111 and the steel ball 116 is pressed onto a ratchet trough 121 of the lock rod 12.

When the flat surface 112 of the guide block 111 faces opposite the buffer 113, the spring 115 pushes the steel ball 116 tightly on the ratchet trough 121 of the lock rod 12, so that lock rod 12 can not move. However, if the flat surface 112 faces against the buffer 113, the spring 115 will not push the steel ball 116 too hard against the ratchet trough 121, and thus lock rod 12 is movable. The pin 125 of the lock body 1 is to disposed to be insertable into a hole and a trough 123 of the lock rod 12 to insure that the lock rod 12 will not be pulled out of the lock body 1.

The block 131 is to hold the barrel 2 at a fixed place by riveting a rivet 132 through the hole of the barrel 2 and the block 131.

The barrel 2 has a block 22 at its inner one end which is to confine the cylinder 3 to ensure that it does not slide out of the barrel 2. The cylinder 3 has a protuberance 31 and two dented areas 32. The protuberance 31 may be stopped by the block 22 of the barrel 2 so that the cylinder 3 will not slide out the barrel 2. The two dented areas 32 are to accept an adjustable barrel 412 which has two sides cutted out a portion at one end, so as to match the two dented areas 32.

Adjustable barrel 412 is threaded at its inner bore for the insertion therein of the adjustable rod 41 of the lock hook 4. The lock hook 4 has a adjustable rod 41, a U-hook 42, two plates 43 and two rivets 44. the adjustable rod 41 is threaded into the adjustable barrel 412 and, if the distance between steering wheel and foot brake and/or gas pedal is too long and if the lock rod 12 can not reach that far, the adjustable rod 41 may be rotated to extend the reach to a longer length. The U-hook connects with the adjustable rod 41 by means of two plates 431 which allow the U-hook 42 to be folded and the recess of each of the plate 43 will provide a larger angle when folding the U-hook 42.

Figure 2:
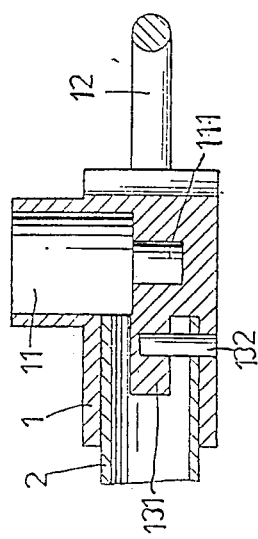
FIG. 2 is a side cross-sectional view of the lock body of present invention.

FIG. 2 shows a side cross-sectional view of the present invention which shows how the barrel 2 has one end fixed by a rivet 132 into the lock body 1.

Figure 3:
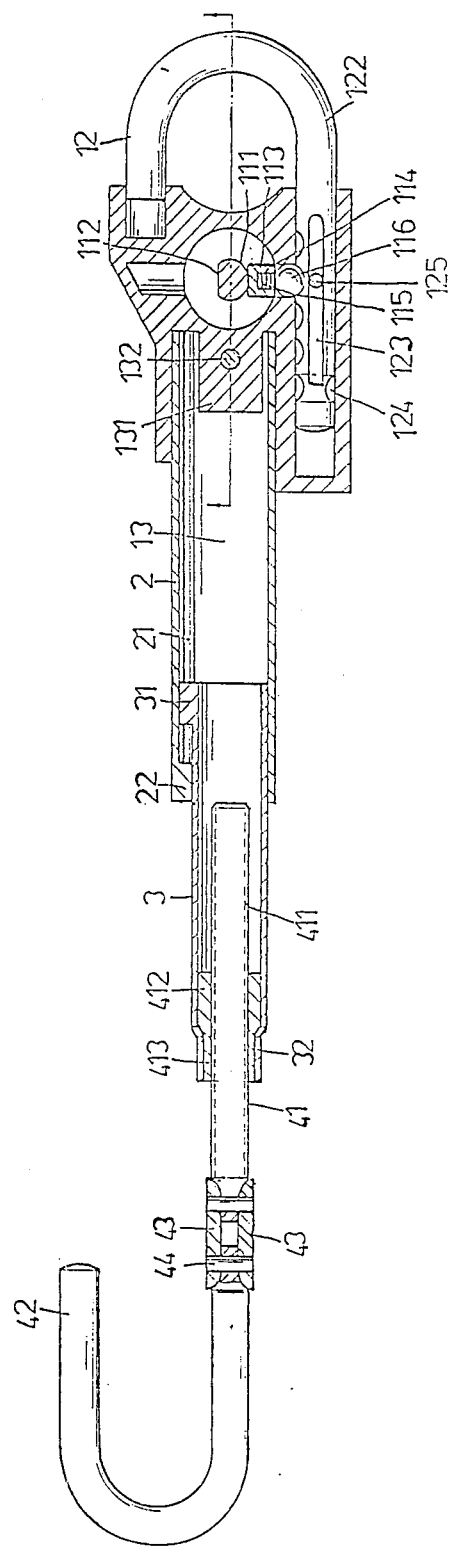
FIG. 3 is a top cross-sectional view of the present invention.

FIG. 3 is a top cross-sectional view of the present invention. As can be seen, the flat surface 112 of the guide block 111 faces opposite the buffer 113 which causes the steel ball 116 to press against the ratchet trough 121 so that the lock rod 12 is not movable.

Figure 4:
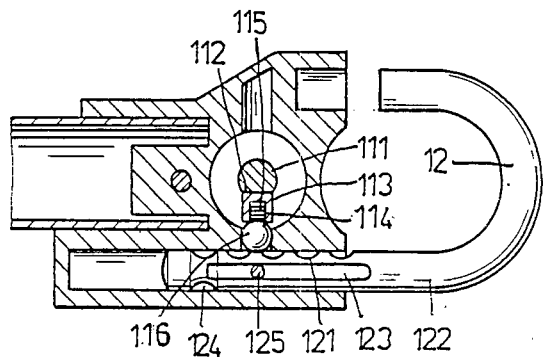
FIG. 4 is another top cross-sectional view of the present invention.

FIG. 4 is another top cross-sectional view of the present invention which shows the flat surface 112 of the guide block 111 facing against the buffer 113 whereupon there is less pressure to the steel ball 116 so that thus the lock rod 12 is movable.

Figure 5:
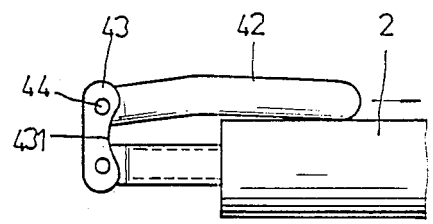
FIG. 5 shows the U hook in folded position.

FIG. 5 shows the U-hook 42 in folded position. By pushing the U-hook 42 upward, the two plates 43 will move upward because of the two rivets 44, and the U-hook 42 is thus folded.

Figure 6:
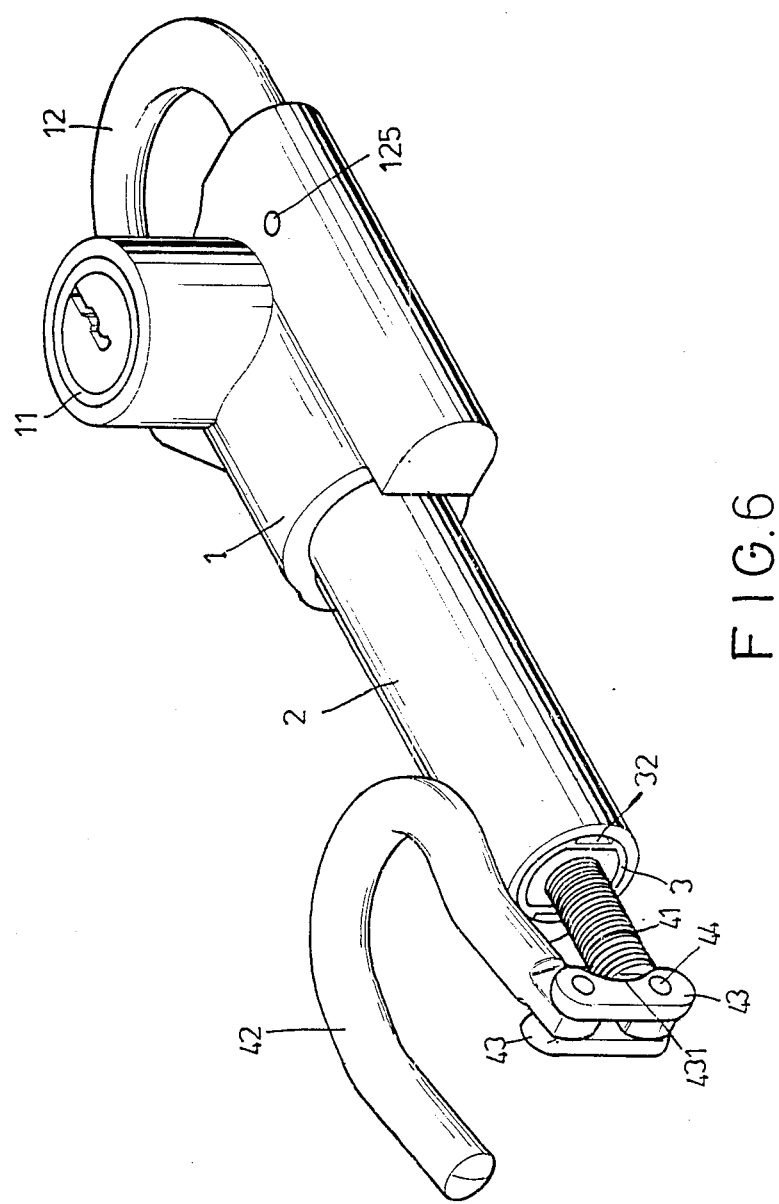
FIG. 6 is a perspective view of the present invention.

FIG. 6 is a perspective view of the present invention. This figure illustrates that the present invention provides the flexibility of an adjustable length.

Figure 7:
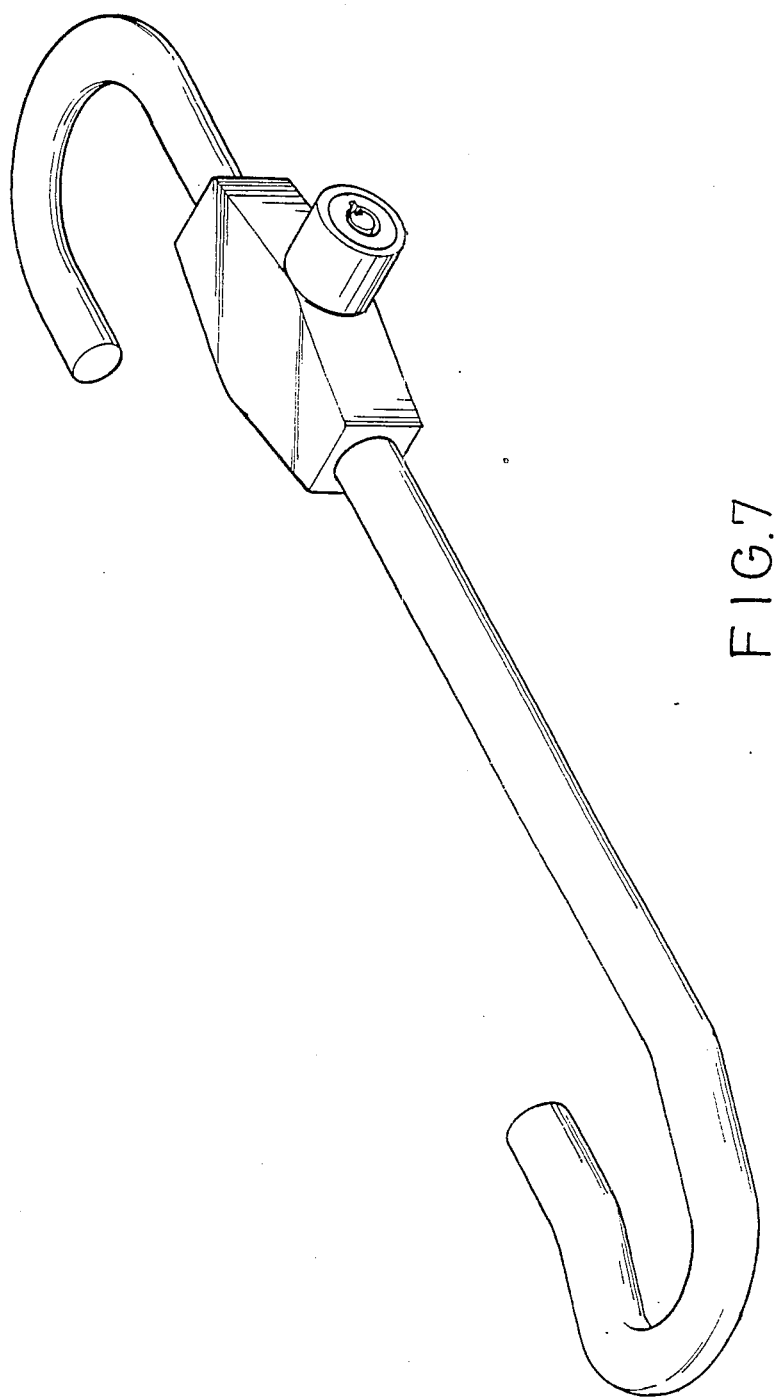
FIG. 7 is a pespective view of the prior art.

FIG. 7 is a perspective view of a prior art device of the type that typically takes too much space in storage.

I claim:

1. An adjustable car lock device, comprising:
 a lock body having a spindle, a lock rod and a cylinder hole, wherein said spindle is located at a top portion of the lock body and includes a movable buffer with a hole containing a spring and a steel ball biased outwardly of the buffer by the spring and further includes a movable guide block to guide and control the movement of said lock rod by coacting with the buffer and ball, said cylinder hole being shaped and sized for the insertion of a barrel therein;
 a barrel, having a block at one end and connected at a second end to the lock body;
 a cylinder having a protuberance at one end and two dented areas at a second end, said cylinder being placed in the barrel so that the protuberance will prevent the cylinder from sliding out of said barrel, said two dented areas cooperating to accept an adjustable barrel;

an adjustable barrel having two cutout portions at one end and threaded at an inner bore, the two cutout portions in the assembled device being inserted into said two dented areas of said cylinder and said inner bore thread engaging a portion of an adjustable rod inserted therethrough;

wherein said guide block has a flat surface such that when the flat surface is facing away from the buffer the steel ball is forcibly engaged with said lock rod to keep it from moving the flat surface faces toward said buffer, the steel ball is held against the lock rod with a force that is small enough so that lock rod is movable by a user.

2. An adjustable lock device according to claim 1, wherein:
the lock rod is selectively locatable within the lock body by threaded rotation with respect to the inner base thread of the adjustable barrel.

3. An adjustable lock device according to claim 1, wherein:
the lock rod comprises a pivotably attached hook at one end.

4. An adjustable lock device according to claim 2, wherein:
the lock rod comprises a pivotably attached hook at one end.

* * * * *